Patented July 13, 1948

2,444,960

UNITED STATES PATENT OFFICE 2,444,960

PROCESS OF PREPARING CARBINOLS

Lee Irvin Smith and Joseph A. Sprung, Minneapolis, Minn., assignors to Regents of the University of Minnesota, Minneapolis, Minn., a corporation of Minnesota No Drawing. Continuation of application Serial No. 453,282, August 1, 1942. This application August 31, 1942, Serial No. 456,791

3 Claims. (Cl. 260—633)

This invention relates to methods of preparing di-substituted beta-haloethyl-carbinols and more particularly the invention provides methods of producing the di-alkyl-beta-haloethyl-carbinol wherein one of the alkyls is methyl and the other alkyl is 4,8,12-trimethyl-tridecyl, a new compound of especial usefulness in new syntheses of tocopherols.

It is a general object of the invention to provide di-alkyl-beta-haloethyl-carbinols and more specifically to provide 1-halo-3,7,11,15-tetramethyl-hexadecanol-3, viz., the di-alkyl-beta-haloethyl-carbinol wherein one alkyl is methyl and the other is 4,8,12-trimethyl-tridecyl, and to provide methods for producing such compounds.

As first starting ingredient there is utilized a Grignard reagent,

wherein $R_1$ is a short chain alkyl such as methyl, ethyl, propyl, butyl, or the like, or a long chain alkyl, such as 4,8,12-trimethyl-tridecyl or an aryl such as phenyl or nephthyl and Ha is a halogen such as chlorine, bromine or iodine. As this halogen is eliminated in subsequent reactions, it is relatively immaterial which is used, altho the chloride is preferred because of availability, cost and favorable reacting characteristics.

As a second starting ingredient, there is used a beta-haloethyl substituted ketone such as beta-chloroethyl alkyl or aryl substituted ketone or beta-bromoethyl alkyl or aryl substituted ketone having the general structure

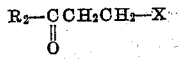

in which $R_2$ is a short chain alkyl such as methyl, ethyl, propyl, butyl or the like, or a long chain alkyl, such as 4,8,12-trimethyl-tridecyl or an aryl such as phenyl or naphthyl, and X is a halogen such as chlorine, bromine, or iodine. This halogen remains in the product and where such product is subsequently used in the tocopherol syntheses, it is preferable that the halogen be chlorine or bromine.

The two starting ingredients are admixed in approximately equal molecular proportions and preferably under cold conditions (0° C. or thereabouts) although somewhat higher temperatures may be used if desired. The lower temperature is preferred since the second mentioned starting ingredient, the beta-haloethyl substituted ketone is somewhat unstable and tends to decompose at higher temperatures.

The two starting ingredients aforementioned are gradually admixed preferably with stirring and the addition product is then decomposed, i. e., hydrolyzed under acid conditions, preferably with dilute hydrochloric acid or ammonium chloride solution. The resultant carbinol is formed and is then separated and purified.

The invention is further illustrated by the following examples which however are not to be taken as limiting the broader aspects of the invention herein described and claimed.

Example I

A solution of ethyl magnesium bromide, prepared from 32.7 grams (0.3 mole) of ethyl bromide and 7.3 grams (0.3 mole) of magnesium in 75 cc. of ether was gradually cooled to 0° C. and 31.5 grams (0.3 mole) of 4-chloro-butanone-2 were gradually added with stirring. The addition product was decomposed with cold dilute hydrochloric acid, extracted three times with ethyl ether, washed once with water and dried over sodium sulfate. The ether solution was colorless but darkened when the solvent was removed. The resultant 5-chloro-3-methylpentanol-3 boiled at 104–105° C. at 50 mm. of mercury pressure and weighed 21.5 grams (51%). It had a camphor-like odor. The structure of the resultant compound is believed to be

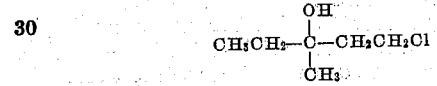

The analysis of the resultant carbinol was carbon 52.61%, hydrogen 9.81%, whereas the theoretical percentages calculated on the formula $C_6H_{13}OCl$ are carbon 52.70% and hydrogen 9.59%.

Example II

Lauryl magnesium bromide was prepared from 25 grams (0.10 mole) of lauryl bromide and 2.5 grams (0.103 mole) magnesium in 75 cc. of dry ethyl ether. To the vigorously stirred solution of this Grignard reagent, maintained at 15° C., there were slowly added over a period of one hour 8.5 grams (0.08 mole) of 4-chloro-butanone-2 in 25 cc. of dry ethyl ether. It may be noted in passing that the Grignard reagent precipitated at 0° C. and 15° C. was therefore selected as the operating temperature. The addition product was decomposed with cold water solution of ammonium chloride and the resultant carbinol separated and purified as in Example I. The resultant 1-chloro-3-methyl-pentadecanol-3 boiled at 165–170° C., at 3 mm. of mercury pressure and the yield was 34.5% (9.5 grams) based upon the amount of lauryl bromide used. In this example the theoretical amount of ketone was not added because the lauryl bromide probably did not yield more than 80% lauryl magnesium bromide. The structure of the resultant 1-chloro-3-methyl-pentadecanol-3 is believed to be

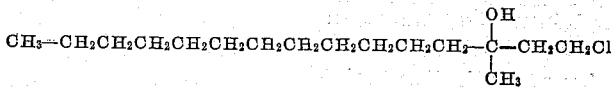

The analysis showed 70.03% carbon and 11.43% hydrogen whereas the theoretical percentages based upon the formula $C_{16}H_{33}OCl$ are carbon 69.39% and hydrogen 12.02%.

*Example III*

The Grignard reagent starting material was made with 4.85 grams (0.2 mole) of magnesium in 100 cc. of ether and 66 grams of 4,8,12-trimethyl-tridecanyl bromide (which was contaminated with approximately 25% of the ethyl ether of 4,8,12-trimethyl-tridecanol-1). To the Grignard reagent thus prepared there were slowly added at 0° C., 21.0 grams (0.2 mole) of 4-chloro-butanone-2 in 50 cc. of dry ether. After refluxing for ½ hour, the Grignard reagent was decomposed (hydrolyzed) with cold dilute hydrochloric acid, washed with water, and dried over sodium sulfate. The ether solution was colorless but the residue darkened when the ether was removed. Distillation was carried out in a nitrogen atmosphere. A low boiling fraction consisted of some unreacted 4-chloro-butanone-2 which partially decomposed in the distillation flask, giving some solid decomposition products that were deposited in the condenser of the fraction cutter used. The distillation did not proceed smoothly until all of these substances had distilled over. The second fraction having a boiling point 120–165° C., at 2 mm. of Hg pressure, weighed 29.3 grams and yielded 19 grams of a colorless liquid, boiling point 120–128° C. at 2 mm. of Hg pressure upon redistillation. This fraction had a refractive index of 25° C. of 1.4375 and was recovered ethyl ether of 4,8,12-trimethyl-tridecanol-1 contaminated with the hydrocarbon 4,8,12-trimethyl-tridecane. The third (desired) fraction boiled at 165–175° C., at 2 mm. of Hg pressure, and was a faint yellow-green viscous oil. It weighed 21 grams, a 38% yield, based upon the amount of bromide present in the original mixture. Upon redistillation of the resultant product, 1-chloro-3,7,11,15-tetramethyl-hexadecanol-3 boiled at 173–175° C., at 2 mm. of Hg pressure and was found to have a refractive index of 1.4620 at 25° C. The structure of this compound is believed to be:

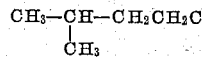
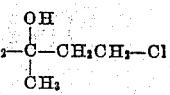

The product contained 72.22% carbon and 12.23% hydrogen whereas theoretical percentages of these elements, calculated upon the formula $C_{20}H_{41}OCl$ are 72.12% carbon and 12.42% hydrogen.

The resultant product which may also be called isophytol-hydrochloride or 4,8,12-trimethyl-tridecyl-beta-chloro-ethyl-methyl-carbinol, has especial usefulness in the synthesis of the tocopherol chromans.

The present application is a continuation of the subject matter of our application Serial No. 453,282, filed August 1, 1942, now abandoned.

Many variations will occur to those familiar with the art and are intended to be within the purview of the invention described and claimed.

What we claim is:

1. 4,8,12-trimethy-tridecyl-beta-haloethyl-methyl-carbinol.

2. 4,8,12-trimethyl-tridecyl-beta-chloroethyl-methyl-carbinol.

3. 4,8,12-trimethyl-tridecyl-beta-bromoethyl-methyl-carbinol.

LEE IRVIN SMITH.
JOSEPH A. SPRUNG.

REFERENCES CITED

The following references are of record in the file of this patent:

UNITED STATES PATENTS

| Number | Name | Date |
|---|---|---|
| 1,114,735 | Davis | Oct. 27, 1914 |
| 1,150,251 | Davis | Aug. 17, 1915 |
| 1,150,252 | Davis | Aug. 17, 1915 |

FOREIGN PATENTS

| Number | Country | Date |
|---|---|---|
| 508,292 | Great Britain | June 28, 1939 |

OTHER REFERENCES

Vanino, "Handbuch der Praparitiven Chemie" (1914), vol. II., page 34.

Gatterman, "Practical Methods of Organic Chemistry," 3rd ed. (1923), pages 348–353.

Fieser, "Experiments in Organic Chemistry" (1935), pages 67–71.